United States Patent
Ramkull

(10) Patent No.: US 10,201,021 B2
(45) Date of Patent: Feb. 5, 2019

(54) ESTABLISHMENT OF AN RRC CONNECTION IN A MOBILE COMMUNICATIONS TERMINAL

(71) Applicant: Telefonaktiebolaget L M Ericsson (publ), Stockholm (SE)

(72) Inventor: Joachim Ramkull, Lund (SE)

(73) Assignee: TELEFONAKTIEBOLAGET LM ERICSSON (publ), Stockholm (SE)

(*) Notice: Subject to any disclaimer, the term of this patent is extended or adjusted under 35 U.S.C. 154(b) by 75 days.

(21) Appl. No.: 14/433,718

(22) PCT Filed: Oct. 2, 2013

(86) PCT No.: PCT/EP2013/070569
§ 371 (c)(1),
(2) Date: Apr. 6, 2015

(87) PCT Pub. No.: WO2014/056781
PCT Pub. Date: Apr. 17, 2014

(65) Prior Publication Data
US 2015/0250007 A1 Sep. 3, 2015

Related U.S. Application Data

(60) Provisional application No. 61/714,278, filed on Oct. 16, 2012.

(30) Foreign Application Priority Data

Oct. 9, 2012 (EP) ..................................... 12187831

(51) Int. Cl.
*H04W 76/10* (2018.01)
*H04W 76/18* (2018.01)

(52) U.S. Cl.
CPC ........... *H04W 76/10* (2018.02); *H04W 76/18* (2018.02)

(58) Field of Classification Search
CPC ............................. H04W 76/02; H04W 76/027
See application file for complete search history.

(56) References Cited

U.S. PATENT DOCUMENTS 6,640,239 B1 * 10/2003 Gidwani ........... H04L 29/06027
370/353
2007/0191010 A1 * 8/2007 Kim .................... H04W 76/027
455/436

(Continued)

FOREIGN PATENT DOCUMENTS

| EP | 1 814 270 A1 | 8/2007 |
| EP | 2475213 A2 | 7/2012 |
| WO | 2005/048631 A1 | 5/2005 |

OTHER PUBLICATIONS

3GPP TS 25.331 V11.3.0 (Sep. 2012), 3rd Generation Partnership Project; Technical Specification Group Radio Access Network; Radio Resource Control (RRC); Protocol specification (Release 11), Table of Contents (ToC), 37 pages.

(Continued)

*Primary Examiner* — Lonnie V Sweet
(74) *Attorney, Agent, or Firm* — Leffler Intellectual Property Law, PLLC

(57) ABSTRACT

A mobile communications terminal comprising a memory, a radio interface and a controller is disclosed. The controller is configured to enable a multiple-layer protocol stack comprising at least a Network layer to establish an RRC connection through said radio interface by transmitting an RRC connection request to a first base station, receiving a response; determine a cause of reject, notify a higher layer, and establishing a second connection for communicating through.

12 Claims, 5 Drawing Sheets

(56) References Cited

U.S. PATENT DOCUMENTS

| | | | |
|---|---|---|---|
| 2008/0025314 A1* | 1/2008 | Lee | H04L 1/1832 370/394 |
| 2009/0061908 A1* | 3/2009 | Kuo | H04W 60/04 455/458 |
| 2010/0151859 A1 | 6/2010 | Hsu | |
| 2010/0227611 A1* | 9/2010 | Schmidt | H04W 4/06 455/434 |
| 2010/0328032 A1* | 12/2010 | Rofougaran | G06F 21/32 340/5.82 |
| 2011/0053597 A1* | 3/2011 | Lee | H04W 36/22 455/436 |
| 2011/0149725 A1 | 6/2011 | Zhao et al. | |
| 2012/0064884 A1 | 3/2012 | Ramachandran et al. | |
| 2012/0094707 A1* | 4/2012 | Chen | H04W 76/027 455/517 |

OTHER PUBLICATIONS

3GPP TS 25.331 V11.3.0 (Sep. 2012), 3rd Generation Partnership Project; Technical Specification Group Radio Access Network; Radio Resource Control (RRC); Protocol specification (Release 11), Section 8.1.3 and Section 8.1.3.9, 19 pages.
PCT International Search Report, dated Oct. 28, 2013, in connection with International Application No. PCT/EP2013/070569, all pages.
PCT Written Opinion, dated Oct. 28, 2013, in connection with International Application No. PCT/EP2013/070569, all pages.

\* cited by examiner

ESTABLISHMENT OF AN RRC CONNECTION IN A MOBILE COMMUNICATIONS TERMINAL

CROSS-REFERENCE TO RELATED APPLICATIONS

This application claims priority under 35 U.S.C. § 119 to European Patent Application No. 12187831.8, filed Oct. 9, 2012, which is hereby incorporated herein by reference in its entirety. This application also claims the benefit of U.S. Provisional Application No. 61/714,278, filed Oct. 16, 2012, which is hereby incorporated herein by reference in its entirety.

TECHNICAL FIELD

This application relates to a method, a user equipment, such as a mobile communications terminal, and a computer-readable storage medium for an improved establishment of an RRC (Radio Resource Control) connection, and in particular to a method, a user equipment, such as a mobile communications terminal, and a computer-readable storage medium for an improved handling of a reject when establishing an RRC connection.

BACKGROUND

Contemporary user equipments, such as mobile communications terminals, are becoming more and more advanced and the amount of data that is handled and transmitted or received by a mobile communications terminal is growing. Users are thus becoming more and more dependent on establishing a data connection quickly without experiencing inactive periods, which are both time-consuming and also stressful.

In the 3GPP WCDMA RRC Connection Establishment procedure a UE requests the network to establish a connection between the UE and the network for the purpose of service handling. In some situations the network may be congested and therefore rejects the RRC connection establishment request. According to the 3GPP specification the UE shall then, if the network indicates so, wait a specified time before a new attempt to request a connection to the network is made by the UE. The reject message received from the network may also include information to redirect the UE to another WCDMA frequency or another RAT (Radio Access Technology).

From the user perspective this situation, where the UE has to wait before retrying the connection establishment request, will be perceived as a "hanging" situation. Within the same connection establishment sequence the UE shall re-attempt the connection request up to 7 times, each with a wait time period of up to 15 seconds. This means that the hanging situation in a worst case scenario (from an RRC perspective) could last for 100 seconds.

There is thus a need for an improved manner of establishing a connection when the required network returns a congestion or other reject message in response to a request to establish a connection.

SUMMARY

It is a further object of the teachings of this application to overcome the problems listed above by providing a mobile communications terminal comprising a memory, a radio interface and a controller, wherein said controller is configured to enable a multiple-layer protocol stack (OSI) comprising at least a Network layer (Layer 3) to establish a radio resource connection, such as an RRC connection, through said radio interface by transmitting an radio resource connection request to a first base station, receiving a response, determine a cause of reject, notify a higher layer; and establishing a second connection for communicating through.

In one embodiment the controller is further configured to establish said second connection for communicating through by transmitting an RRC connection request to a second base station, receiving a response, and in response thereto establishing a dedicated channel for communicating over said dedicated channel through said second base station.

It is a further object of the teachings of this application to overcome the problems listed above by providing a method for use in a mobile communications terminal comprising a memory, a radio interface and a controller, wherein said controller is configured to enable a multiple-layer protocol stack comprising at least a Network layer to establish a radio resource connection, such as an RRC connection, through said radio interface, said method comprising transmitting an radio resource connection request to a first base station, receiving a response, determine a cause of reject, notify a higher layer; and establishing a second connection for communicating through.

It is a further object of the teachings of this application to overcome the problems listed above by providing a computer readable medium comprising instructions that when loaded into and executed by a controller, such as a processor, cause the execution of a method according to herein.

The inventors of the present application have realized, after inventive and insightful reasoning, that by enabling a second (possibly temporary) connection to be established while the preferred connection is established, or as an alternative thereto, the period of inactivity is greatly reduced if not mitigated completely.

In one embodiment the teachings herein is applicable to the RAT (Radio Access Technology) communication standard WCDMA. In prior art WCDMA systems the RRC Connection establishment procedure is arranged to resend the RRC Connection Request, if a previous request was rejected, without specifying the reject cause and/or wait time to higher protocol layers.

The teachings herein also find use in other RATs with the similar radio channel connection behavior. For example, the prior art RRC connection procedure in the LTE RAT is arranged to only make one attempt and then inform higher protocol layers.

The teachings herein provide the benefit that the latency of establishing a connection is reduced as the user equipment will abort the ongoing connection attempt and try another connection source to reduce the latency.

This also enables a connection requesting application or service to abort the connection attempts prematurely and not have to wait the full proposed waiting time.

Other features and advantages of the disclosed embodiments will appear from the attached detailed disclosure.

BRIEF DESCRIPTION OF DRAWINGS

The invention will be described in further detail under reference to the accompanying drawings in which.

DETAILED DESCRIPTION

The disclosed embodiments will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

Figure 1:
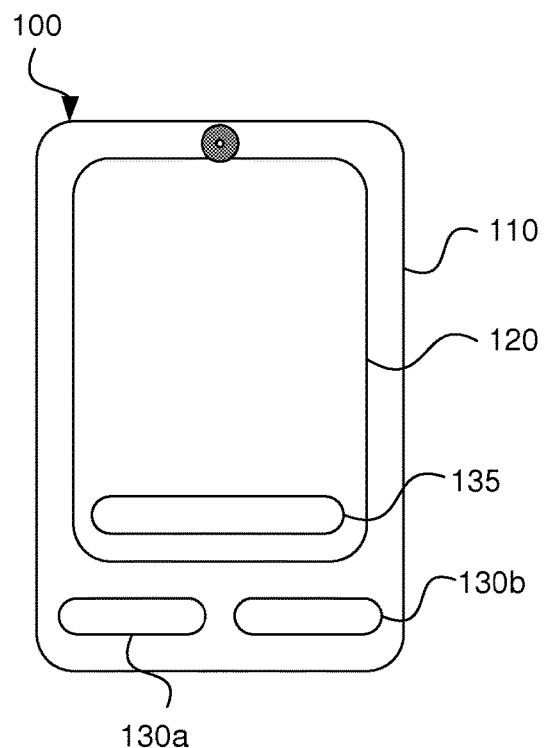
FIG. 1 shows a schematic view of a mobile communications terminal according to one embodiment of the teachings of this application.

FIG. 1 shows a schematic overview of a User Equipment (UE) 100 adapted according to the teachings herein. In the embodiment shown the User Equipment (UE) is a mobile communications terminal such as a mobile phone 100. In other embodiments the mobile communications terminal 100 is a personal digital assistant, a media player, a location finding device or any hand-held device capable of communicating with other devices.

The mobile phone 100 comprises a housing 110 in which a display 120 is arranged. In one embodiment the display 120 is a non-touch display. In other embodiments the display 120 is a touch display. Furthermore, the mobile phone 100 comprises two keys 130a and 130b. In one embodiment the mobile phone 100 is configured to display and operate a virtual key 135 on the touch display 120. It should be noted that the number of keys 130 and virtual keys 135 are dependent on the design of the mobile phone 100 and an application that is executed on the mobile phone 100. In one embodiment the communications terminal 100 comprises an ITU-T keypad or a QWERTY (or equivalent) keypad in addition to or as an alternative to a touch-sensitive display. In an embodiment where the keypad is an alternative to a touch-sensitive display, the display 120 is a non-touch-sensitive display.

Figure 2:
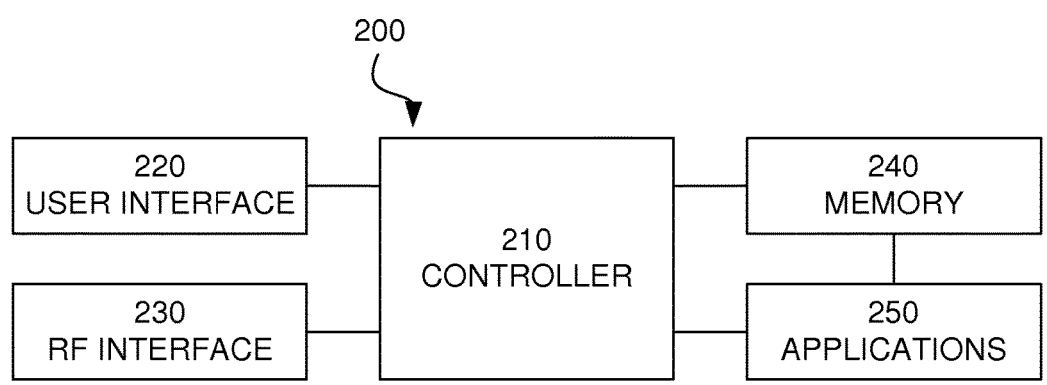
FIG. 2 shows a schematic view of the general structure of a mobile communications terminal according to one embodiment of the teachings of this application.

FIG. 2 shows a schematic view of the general structure of a User Equipment (UE) which may be a mobile communications terminal such as a mobile phone 100 according to FIG. 1. The mobile communications terminal 200 comprises a controller 210 which is responsible for the overall operation of the mobile communications terminal and is preferably implemented by any commercially available CPU ("Central Processing Unit"), DSP ("digital signal processor") or any other electronic programmable logic device, or a combination of such processors and/or other electronic programmable logic device. The controller 210 may be implemented using instructions that enable hardware functionality, for example, by using executable computer program instructions in a general-purpose or special-purpose processor that may be stored on a computer readable storage medium (disk, memory etc) 240 to be executed by such a processor. The controller 210 is configured to read instructions from the memory 240 and execute these instructions to control the operation of the mobile communications terminal 100. The memory 240 may be implemented using any commonly known technology for computer-readable memories such as ROM, RAM, SRAM, DRAM, CMOS, FLASH, DDR, EEPROM memory, flash memory, hard drive, optical storage or any combination thereof. The memory 240 is used for various purposes by the controller 210, one of them being for storing application data and various software modules in the mobile communications terminal.

The software modules include a real-time operating system, drivers for a user interface 220, an application handler as well as various applications 250. The applications 250 are sets of instructions that when executed by the controller 210 control the operation of the mobile communications terminal 100. The applications 250 can include a messaging application for short messaging service (SMS), multimedia messaging service (MMS) and electronic mail, a media player application, as well as various other applications 250, such as applications for voice calling, video calling, web browsing, document reading and/or document editing, an instant messaging application, a phonebook application, a calendar application, a control panel application, one or more video games, a notepad application, location finding applications, etc.

The mobile communications terminal 200 further comprises the user interface 220, which in the mobile phone 100 of FIG. 1 is comprised of the display 120, the keys 130, 135, a microphone and a loudspeaker. The user interface (UI) 220 also includes one or more hardware controllers, which together with the user interface drivers cooperate with the display 120, keypad 130, as well as various other I/O devices such as vibrator, ringtone generator, LED indicator, etc. As is commonly known, the user may operate the mobile communications terminal through the man-machine interface thus formed.

The mobile communications terminal 200 further comprises a radio frequency interface 230, which is adapted to allow the mobile communications terminal to communicate with other communications terminals in a radio frequency band through the use of different radio frequency technologies. Examples of such technologies are W-CDMA, GSM, UTRAN, LTE and NMT to name a few. The controller 210 is configured to operably execute the applications 250, such as the voice call and message handling applications, through the RF interface 230 and software stored in the memory 240. The software includes various modules, protocol stacks, drivers, etc. to provide communication services (such as transport, network and connectivity) for the RF interface 230, and optionally a Bluetooth interface and/or an IrDA interface for local connectivity. The RF interface 230 comprises an internal or external antenna as well as appropriate radio circuitry for establishing and maintaining a wireless link to a base station. As is well known to a person skilled in the art, the radio circuitry comprises a series of analogue and digital electronic components, together forming a radio receiver and transmitter. These components include, for example, band pass filters, amplifiers, mixers, local oscillators, low pass filters, AD/DA converters, etc.

Figure 3:
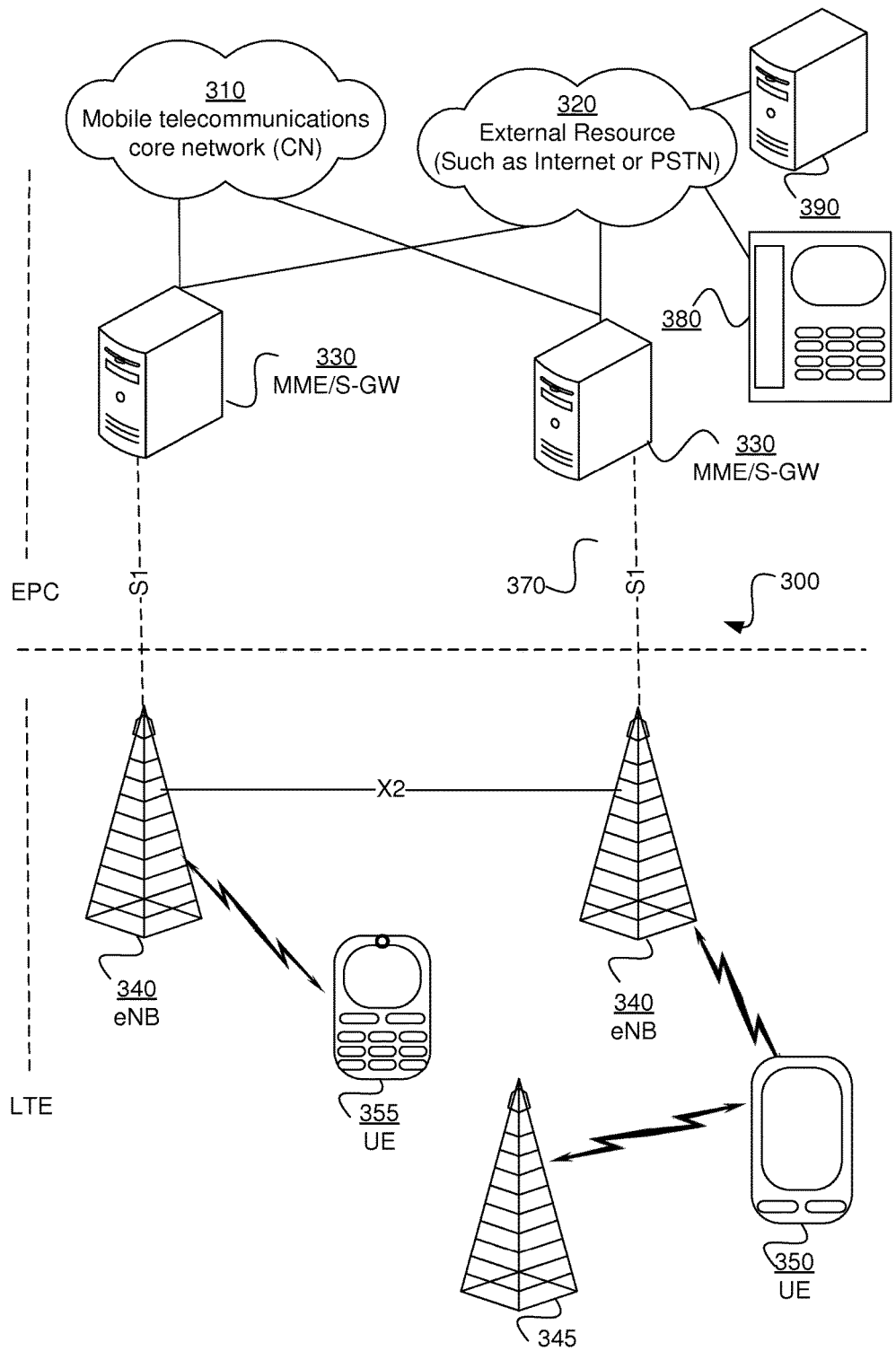
FIG. 3 shows a schematic view of a telecommunications network comprising a mobile communications terminal according to one embodiment of the teachings of this application.

FIG. 3 shows a schematic view of the general structure of a telecommunications system 300 according to the teachings herein. In the telecommunication system of FIG. 3, various telecommunications services such as cellular voice calls, www/wap browsing, cellular video calls, data calls, facsimile transmissions, music transmissions, still image transmissions, video transmissions, electronic message transmissions and electronic commerce may be performed between a mobile communications terminal or User Equipment (UE) 100, 200, 300, 350 according to the disclosed embodiments and other communications terminals, such as another mobile communications terminal 355 or a stationary telephone 380. The mobile communications terminals 350, 355 are connected to a mobile telecommunications network 310 through Radio Frequency links via base stations 340.

The telecommunications system 300 comprises at least one server 330. A server 330 has a data storage and a controller that may be implemented by any commercially available CPU ("Central Processing Unit"), DSP ("Digital Signal Processor") or any other electronic programmable logic device. In one embodiment such a server is a Mobility Management Entity (MME). In one embodiment such a server is a Gateway (GW). The servers 330 are configured to communicate with a mobile telecommunications core network (CN) 310 and/or an external resource 320 such as the internet or a Public Switched Telephone Network (PSTN). A PSTN 320 is configured to communicate with and establish communication between stationary or portable telephones 380. In one embodiment the external resource comprises or is configured to communicate with an external service provider 390. In one embodiment the servers 330 are configured to communicate with other communications terminals using a packet switched technology or protocol. In such an embodiment the servers 330 may make up an Evolved Packet Core (EPC) layer.

The servers 330 are configured to communicate with nodes, such as base stations 340. In one embodiment the base station 340 is an evolved Node Base (eNB). A base station 340 is further configured to communicate with a server 330. In one embodiment the communication between a server 330 and a base station 340 is effected through a standard or protocol 370. In one embodiment the protocol is S1. A base station 340 is configured to communicate with another base station 340. In one embodiment the communication between a base station 340 and the at least one another base station 340 is effected through a standard or protocol 360. In one embodiment the protocol 360 is X2. A base station 340 is further configured to handle or service a cell. In one embodiment the at least one base stations 340 make up a Long Term Evolution (LTE) layer. In one embodiment the at least one base stations 340 make up an LTE Advanced layer.

In one embodiment the base station 340 is configured to communicate with a mobile communications terminal 350 (100) through a wireless radio frequency protocol.

In one embodiment the telecommunications system 300 is an Evolved Packet System (EPS) network. In one embodiment the telecommunications system is a system based on the 3GPP (3rd Generation Partnership Project) standard. In one embodiment the telecommunications system is a system based on the UMTS (Universal Mobile Telecommunications System) standard, such as W-CDMA (Wideband Code Division Multiple Access). In one embodiment the telecommunications system is a system based on a telecommunications standard such as GSM, D-AMPS, CDMA2000, FOMA or TD-SCDMA. In the embodiment of FIG. 3 the base stations 340 are arranged to communicate according to one (first) RAT, however, as can be seen an alternative or second base station 345 may be arranged to communicate according to a different RAT.

The UE 350 may thus select which RAT to communicate through as is indicated in FIG. 3 by the UE 350 having arrows connecting it with both a base station 340 and an alternative base station 345.

It should be noted that the alternative base station 345 and the base station 340 may be arranged in the same base station.

In one embodiment the UE 350 is configured to establish a connection with the eNB or base station 340 through a Radio Resource Control (RRC) protocol. The RRC protocol is part of the UMTS WCDMA protocol stack and handles the control plane signaling of Layer 3 (or Network layer) of a protocol stack implemented according to the Open Systems Interconnection (OSI) Model, see FIG. 5.

To establish a connection the UE transmits an RRC Connection Request through the Common Control CHannel (CCCH) to the eNB 340. The eNB 340 will determine if resources are available and if so, transmit an RRC Connection Setup message over the CCCH to the UE 350 enabling it to establish a DCH (Dedicated CHannel) for communicating on. Such communication may be a voice call, a video call, data download or upload and also data streaming.

The RRC handles the radio interface (not shown explicitly in FIG. 3, but indicated with the zigzag arrows, and referenced 230 in FIG. 2) of a UE 350. The Radio Interface generally requires a great deal of power when active and the configuration of RRC inactivity timers in a W-CDMA network thus has a considerable impact on the battery life of a UE 350 when a connection is open.

At least in prior art systems, there can only be one RRC connection open or active at one time.

Figure 4:
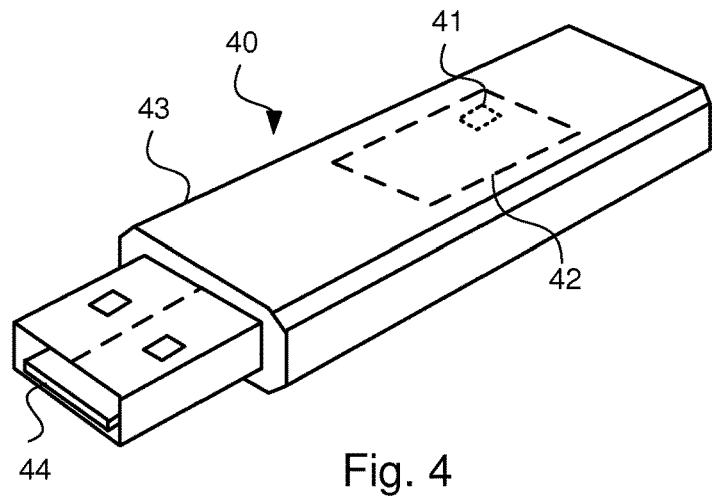
FIG. 4 shows a schematic view of a computer-readable medium according to one embodiment of the teachings of this application.

FIG. 4 shows a schematic view of a computer-readable medium as described in the above. The computer-readable medium 40 is in this embodiment a memory stick, such as a Universal Serial Bus (USB) stick. The USB stick 40 comprises a housing 43 having an interface, such as a connector 44, and a memory chip 42. The memory chip 42 is a flash memory, that is, a non-volatile data storage that can be electrically erased and re-programmed. The memory chip 42 is programmed with instructions 41 that when loaded (possibly via the interface 44) into a controller, such as a processor, executes a method or procedure according to the embodiments disclosed above. The USB stick is arranged to be connected to and read by a reading device, such as a terminal according to FIG. 1, for loading the instructions into the controller. It should be noted that a computer-readable medium can also be other mediums such as compact discs, digital video discs, hard drives or other memory technologies commonly used. The instructions can also be downloaded from the computer-readable medium via a wireless interface to be loaded into the controller.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

Figure 5:
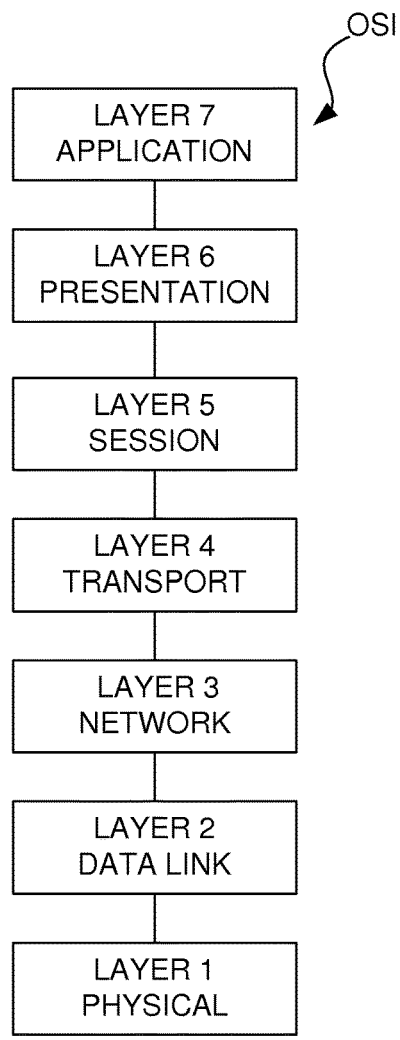
FIG. 5 shows a schematic view of a multiple-layer protocol model.

FIG. 5 shows an overview of the Open Systems Interconnection (OSI) model (ISO/IEC 7498-1) which is a product of the Open Systems Interconnection effort at the International Organization for Standardization. The OSI model is a multiple-layer protocol stack model and a prescription of how to characterize and standardize the functions of a communications system in terms of abstraction layers. Similar communication functions are grouped into logical layers. A layer serves the layer above it and is served by the layer below it.

In the OSI there are seven layers, labeled 1 to 7, with layer 1 at the bottom. Each layer is generically known as an N layer. An "N+1 entity" (at layer N+1) requests services from an "N entity" (at layer N).

At each level, two entities interact by means of the N protocol by transmitting protocol data units (PDU). A Service Data Unit (SDU) is a specific unit of data that has been passed down from an OSI layer to a lower layer, and which the lower layer has not yet encapsulated into a protocol data unit (PDU). An SDU is a set of data that is sent by a user of the services of a given layer, and is transmitted semantically unchanged to a peer service user.

The PDU at a layer N is the SDU of layer N−1. The process of changing an SDU to a PDU, consists of an encapsulation process, performed by the lower layer. All the data contained in the SDU becomes encapsulated within the PDU. The layer N−1 adds headers or footers, or both, to the SDU, transforming it into a PDU of layer N−1. The added headers or footers are part of the process used to make it possible to get data from a source to a destination.

To allow a UE to establish a connection quickly and without causing undue and stressful inactive waiting periods, the UE is enabled to establish alternative connections through other channels, possibly temporarily, while waiting for the cause for a connection reject to be resolved at which time the preferred communication channel will be available for establishing a connection on again.

The determination whether to establish such an alternative connection or not is performed at a higher protocol level to reduce the amount of communication required between the layers. This provides a clean and simple layer-to-layer interface in the protocol stack which also enables and facilitates a modular implementation of the protocol stack.

Figure 6:
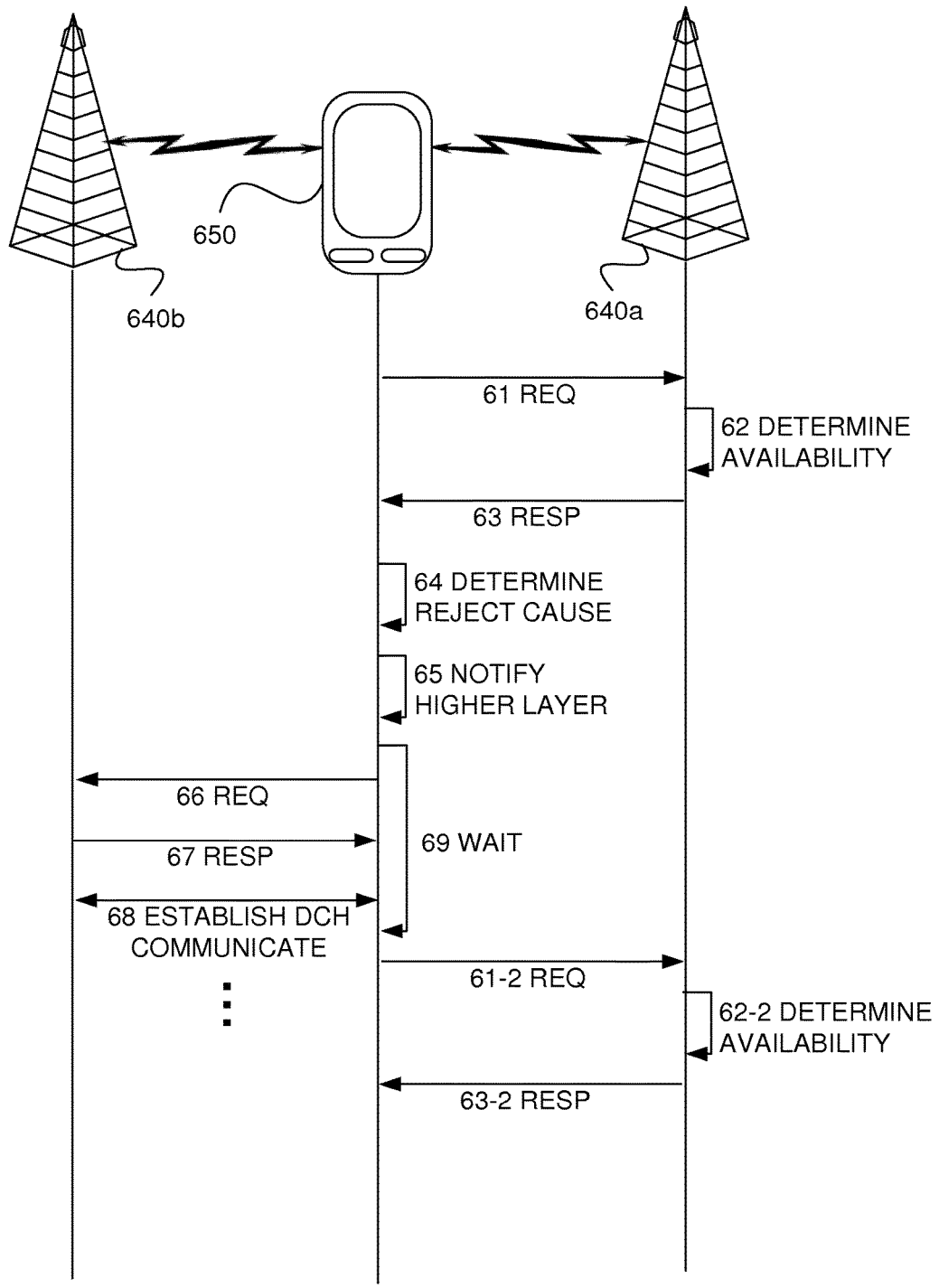
FIG. 6 shows a schematic time view of the communication and operation of a mobile communications terminal according to an example of the teachings of this application.

FIG. 6 shows an example of a UE 650, such as a mobile communications terminal according to herein, and how it communicates with a first eNB or base station 640a. In this example embodiment the UE 650 is the UE 100 of FIG. 1 and the UE 200 of FIG. 2. In this embodiment the UE 650 is a mobile phone. The operation of the UE 650 may be effected through a controller (referenced 210 in FIG. 2) and the UE 650 is configured to operate according to a multiple-layer protocol stack, for example according to the OSI model described with reference to FIG. 5.

The controller of the UE 650 receives a request form a service or application (referenced 250 in FIG. 2) to establish an RRC connection and the UE 650 sends 61 an RRC Connection Request message to said first eNB 640a. The first eNB 640a determines 62 if resources are available (as in the prior art) and returns 63 a response.

Should the eNB 640a determine that there are no available resources, for example due to a congestion, the response will comprise an indication of a reject and possibly the reason for the reject (for example "congestion"), a proposed wait time (for example 10 s) and a proposed number of times (for example 5 times) to retry to establish the connection. In systems such as WCDMA systems, the proposed wait time and proposed number of times are required by the system or server. Also, the number of times to retry may be specified through other channels such as a cell broadcast comprising system information from the base station.

The UE 650 receives the response in a network layer of the protocol stack and determines the cause of the reject 64. The cause can be congestion or an unspecified reason. It should be noted that other causes are also possible and in line with the scope of the teachings of this application.

If the reject cause is congestion, the reason for the reject will most likely clear up in a short while and it may be efficient to try and reconnect to the first 640a. However, if the cause of the reject is unspecified this may indicate a severe error and may take a longer time to recover or clear and it may be less efficient to try and reconnect to the first base station 640a.

The controller of UE 650 notifies an upper layer 65 in the protocol stack of the reject and possibly the cause of the reject, the proposed wait time and the proposed number of reconnection attempts.

The controller determines, in the higher layer, whether the attempt to establish the RRC connection should be aborted or reattempted, possibly after the proposed wait time.

Allowing the controller to perform this determination in a higher layer provides for a clean protocol architecture and minimizes the necessary communication between the protocol layers as only the data on the reject is required by the higher layer, whereas ample information on the requesting service, other services, statuses of the UE 650 etc would be required to be communicated to the network layer. Note that it is also possible to perform the determination in the same (Network) layer.

The controller may base this decision on a priority of the service requesting the RRC connection. For example if the requesting service has a high priority the controller may decide to push through and try to establish the connection regardless of wait time and number of attempts. Similarly, based on design strategies, should the requesting service be of a high priority type the controller may decide to push the connection through by trying to establish an alternative connection. How such a second connection is established will be discussed in the below.

Alternatively or additionally the controller may base the decision whether to abort or reattempt a connection on the proposed wait time. If the proposed wait time is above a threshold value the controller may determine that the attempt should be aborted. The threshold may be dependent on a priority of a requesting service.

Alternatively or additionally the controller may base the decision whether to abort or reattempt a connection on other factors, such as current application or service load in the UE (a high load will hide a slow establishment of a connection), a remaining battery power level (low battery level favors fewer attempts) or the number of available alternatives (few alternatives favors reattempting) to name a few factors.

Should the controller determine that the attempt to establish an RRC connection through the preferred channel or radio access technology (RAT) should be aborted, the controller will attempt to establish an alternative or second connection through an alternative or second channel. The second communication channel may be established according to a second RAT or via a radio interface configured to operate according to the IEEE 802.11 standard (WiFi), a radio interface configured to operate according to the IEEE 802.16 standard (meshnet), a radio interface configured to operate according to the Bluetooth™ standard or a fixed line protocol, such as a protocol configured to operate according to the IEEE 802.3 standard (Ethernet).

The UE 650 attempts to establish the second connection by transmitting 66 a request (REQ) to a second base station or a second eNB 640b (such as a base station 340 or an alternative base station 345 of FIG. 3) which will return a response that is received 67 by the UE 650. If the response (RESP) indicates that the second connection is possible, the UE 650 establishes 68 the RRC connection and starts communicating through the second channel.

It should be noted that, depending on the service and its requirements and capabilities, the second channel may be established over a non-cellular communication. For example, the second channel may be established through a meshnet or other Device-2-Device communication by connection to another UE (355). The second connection can also be established over a WiFi connection (IEEE 802.11), a Meshnet connection, a Bluetooth™ connection or an Ethernet connection (such as IEEE 802.3) as discussed above.

In one embodiment the second eNB 640b operates according to a RAT different from the first eNB 640a.

In one embodiment the second eNB 640b and the first eNB 640a is the same eNB 640, but arranged to communicate through at least two different RATs (or on at least two different frequencies).

In one embodiment the second eNB 640b and the first eNB 640a are arranged to communicate through the same RAT. In such an embodiment the controller may determine that a speedy establishment of a connection is more important than a high quality connection and connect with a second eNB 640b that may be within range but providing a lower quality connection.

The UE may also be configured to attempt to connect to the preferred or first eNB 640a while being connected through the second communication channel, possibly through the second or alternative base station or eNB 640b. This allows for a connection to be established through a preferred communication channel without incurring any inactive period and thereby reduce the latency of the communication.

The manner disclosed can easily be incorporated into existing protocol stack implementations as only one RRC connection is active at any one point. Only the attempts to connect are simultaneous with another RRC connection. Thus only minor modifications to the existing protocols are required. Possibly the active RRC connection is released before attempting to reconnect through the preferred channel.

To further ensure that no RRC collisions occur, the attempts to connect to the preferred channel may be effected during periods of inactivity in the communication through the second or alternative communication channel. Such periods of inactivity may be while waiting for further input from a user, waiting for a response from a remote UE or other service provider or other pauses in the communication. During these periods of inactivity the RRC connection is not active and no direct violation with current RRC protocol standards is created. This allows a manner as taught herein to be easily integrated into an existing telecommunications network without requiring extensive modifications to either device.

The UE 650 may additionally and/or alternatively be configured to 69 wait for the proposed wait time before again attempting to connect to the preferred eNB 640a by sending 61-2 a request (REQ) to the eNB 640b which determines 62-2 the availability and replies 63-2 with a response (RESP).

This enables the RRC protocol to offer a connection requesting service a connection even though the preferred connection is not available for establishing a connection with. The service is thus able to function, albeit at a lower speed perhaps, without having to remain inactive for long periods of time.

The manner taught herein find use in several use cases. Two such use cases will be described below.

In a first use case a user is web browsing on a smartphone (UE) capable of establishing a connection via WCDMA, GSM or WLAN. The user starts a web browser on the smartphone where the primary access is via mobile internet and WCDMA. A WCDMA RRC connection establishment procedure is initiated by the access stack software in the smartphone. The smartphone sends RRC Connection Request to the network. The network responds with an RRC Connection Reject with cause "congestion" and a wait time set to 10 seconds. The access stack then starts a wait timer and, at the same time, indicates to upper or higher layers that the WCDMA network is congested and that the access stack will wait 10 seconds and then make a new RRC connection establishment attempt. In total 5 establishment attempts will be made. If the WLAN connection is available, the connection control application can choose to abort the establishment attempt in WCDMA and instead establish the connection in the WLAN. This allows the user to experience a rapid connection to the network although the preferred connection via WCDMA would in the described case cause a hanging situation.

In the second use case a user is using a laptop computer (UE) with network access via WCDMA, GSM, WLAN or cable (fixed network). The primary access is via WCDMA. The laptop computer is powered on and seeks a network connection. A WCDMA network is detected as present and the network connection application starts to establish a connection via the WCDMA network. A WCDMA RRC connection establishment procedure is initiated by the access stack software in the modem of the laptop computer. The laptop sends RRC Connection Request to the network. The network responds with an RRC Connection Reject with cause "congestion" and a wait time set to 10 seconds. The access stack then starts the wait timer and, at the same time, indicates to upper or higher layers that the WCDMA network is congested and that the access stack will wait 10 seconds and then make a new RRC connection establishment attempt. In total 5 establishment attempts will be made.

There exist no GSM or WLAN connectivity but the network connection application detects that the user has connected a network cable to the lap top computer and therefore aborts the WCDMA connection establishment and connects via the fixed network. As in the first use case, the user experiences a rapid connection to the network although the preferred connection via WCDMA would in the described case cause a hanging situation.

Figure 7:
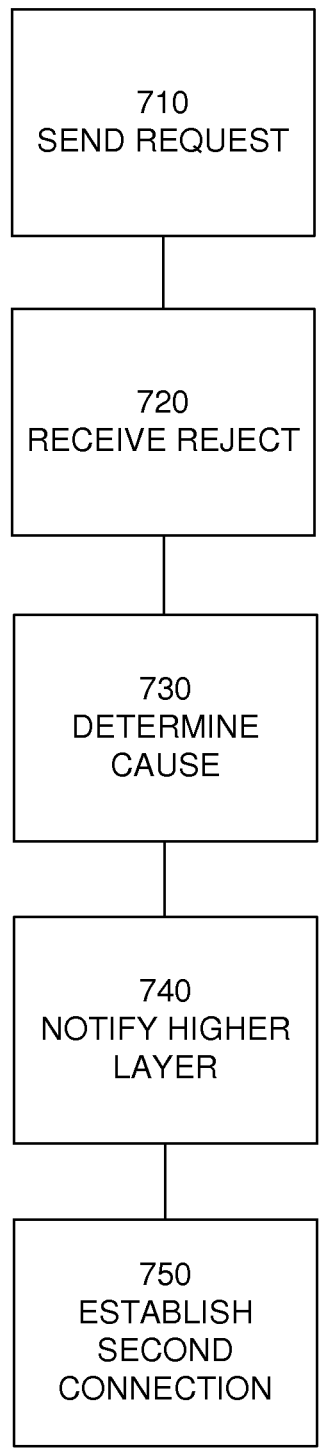
FIG. 7 shows a flow chart for a general method according to an embodiment of the teachings of this application.

FIG. 7 shows a flowchart of a general method according to herein. A mobile communications terminal or UE attempts to establish a radio resource communication channel, such as by transmitting or sending 710 an RRC Request to a base station. The UE receives 720 a response indicating a Reject and determines 730 the cause of the reject. The UE then notifies 740 a higher layer in a protocol stack and attempts to establish 750 a second connection for communicating through over a second channel as an alternative to or instead of the preferred channel.

One benefit of the manner disclosed herein is that it takes use of the capabilities of modern day UEs to establish alternate communication channels to reduce any periods of inactivity.

Another benefit is that the manner disclosed herein is simple to integrate into existing network architectures as it requires a minimum—if any—modifications to the devices involved. For example, only minor modifications are needed to adapt a UEs existing protocol stack. Also, no modifications are required for the base stations 640 or other UEs operating in the same network.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A mobile communications terminal comprising a memory, a radio interface and a controller, wherein said controller is configured to enable a multiple-layer protocol stack comprising at least a Network layer to establish a Radio Resource Control (RRC) connection through said radio interface by:
   attempting to establish a first connection by transmitting an RRC connection request to a first base station;
   receiving, in one of the layers of the multiple-layer protocol stack, a response from the first base station, wherein the response includes an indication of a reject;
   notifying a higher layer of the multiple-layer protocol stack about the reject including a proposed wait time until a reattempt to establish the first connection can be made, wherein the higher layer is higher in the multiple-layer protocol stack than said one of the layers;
   in said higher layer of the multiple layer protocol stack enabled by the controller, determining whether to reattempt to establish the first connection, wherein the determining comprises deciding not to reattempt to establish the first connection if the proposed wait time exceeds a threshold value that is dependent on a priority level of a service in a higher layer requesting the first connection, wherein the priority level is one of a plurality of possible priority levels; and
   when it is determined not to reattempt to establish the first connection, establishing a second connection for communicating through by:
      transmitting an RRC connection request to a second base station;
      receiving a response; and in response thereto
      establishing a dedicated channel for communicating over said dedicated channel through said second base station.

2. The mobile communications terminal according to claim 1, wherein the controller is further configured to establish said second connection for communicating over by:
   transmitting a connection request to a second mobile communications terminal;
   receiving a response; and in response thereto
   establishing a dedicated channel for communicating over said dedicated channel through said second mobile communications terminal.

3. The mobile communications terminal according to claim 2, further comprising a display, wherein the controller is further configured to:
   display a notification on said display prompting a user whether said second connection should be established or not;
   receive a response via a user interface; and
   determine, in said higher layer, whether said second connection should be established or not based on said response.

4. The mobile communications terminal according to claim 1, wherein the controller is further configured to, in said higher layer, determine whether said second connection should be established or not based on a cause of reject indicated by said response received from said first base station.

5. The mobile communications terminal according to claim 4, wherein said cause of reject is congestion.

6. The mobile communications terminal according to claim 4, wherein said cause of reject is unspecified.

7. The mobile communications terminal according to claim 1, wherein the controller is further configured to:
   determine the wait time from said received response received from said first base station;
   determine that said wait time has lapsed and then
   transmit a second RRC connection request to said first base station;
   receive a response; and in response thereto
   establish a dedicated channel for communicating over said dedicated channel through said first base station.

8. The mobile communications terminal according to claim 1, wherein said first base station is configured to communicate according to a first radio access technology and said second base station is configured to communicate according to a second radio access technology.

9. The mobile communications terminal according to claim 1, wherein said first base station is configured to communicate according to a first radio access technology and said second connection for communicating through is established according to a second radio access technology or via a radio interface configured to operate according to the IEEE 802.11 standard, a radio interface configured to operate according to the IEEE 802.16 standard, a radio interface configured to operate according to the Bluetooth™ standard or a fixed line protocol, such as a protocol configured to operate according to the IEEE 802.3 standard.

10. The mobile communications terminal according to claim 1, wherein said first base station is configured to establish said second communication channel through a fixed line communication protocol.

11. A method for use in a mobile communications terminal comprising a memory, a radio interface, and a controller, wherein said controller is configured to enable a multiple-layer protocol stack comprising at least a Network layer to establish a Radio Resource Control (RRC) connection through said radio interface, said method comprising:
   attempting to establish a first connection by transmitting an RRC connection request to a first base station;
   receiving, in one of the layers of the multiple-layer protocol stack, a response from the first base station, wherein the response includes an indication of a reject;
   notifying a higher layer of the multiple-layer protocol stack about the reject including a proposed wait time until a reattempt to establish the first connection can be made, wherein the higher layer is higher in the multiple-layer protocol stack than said one of the layers;
   in said higher layer of the multiple layer protocol stack enabled by the controller, determining whether to reattempt to establish the first connection, wherein the determining comprises deciding not to reattempt to establish the first connection if the proposed wait time exceeds a threshold value that is dependent on a priority level of a service in a higher layer requesting the first connection, wherein the priority level is one of a plurality of possible priority levels; and when it is determined not to reattempt to establish the first connection, establishing a second connection for communicating through by:
  transmitting an RRC connection request to a second base station;
  receiving a response; and in response thereto
  establishing a dedicated channel for communicating over said dedicated channel through said second base station.

12. A nontransitory computer-readable storage medium comprising instructions that, when loaded and executed on a processor, causes a method to be performed, wherein the method is for use in a mobile communications terminal comprising a memory, a radio interface, and a controller, wherein said controller is configured to enable a multiple-layer protocol stack comprising at least a Network layer to establish a Radio Resource Control (RRC) connection through said radio interface, and wherein the method comprises:
  attempting to establish a first connection by transmitting an RRC connection request to a first base station;
  receiving, in one of the layers of the multiple-layer protocol stack, a response from the first base station, wherein the response includes an indication of a reject;
  notifying a higher layer of the multiple-layer protocol stack about the reject including a proposed wait time until a reattempt to establish the first connection can be made, wherein the higher layer is higher in the multiple-layer protocol stack than said one of the layers;
  in said higher layer of the multiple layer protocol stack enabled by the controller, determining whether to reattempt to establish the first connection, wherein the determining comprises deciding not to reattempt to establish the first connection if the proposed wait time exceeds a threshold value that is dependent on a priority level of a service in a higher layer requesting the first connection, wherein the priority level is one of a plurality of possible priority levels; and
  when it is determined not to reattempt to establish the first connection, establishing a second connection for communicating through by:
    transmitting an RRC connection request to a second base station;
    receiving a response; and in response thereto
    establishing a dedicated channel for communicating over said dedicated channel through said second base station.

* * * * *